May 9, 1939.  H. W. GREENUP  2,157,096
THERMAL INSULATION
Filed Feb. 10, 1936
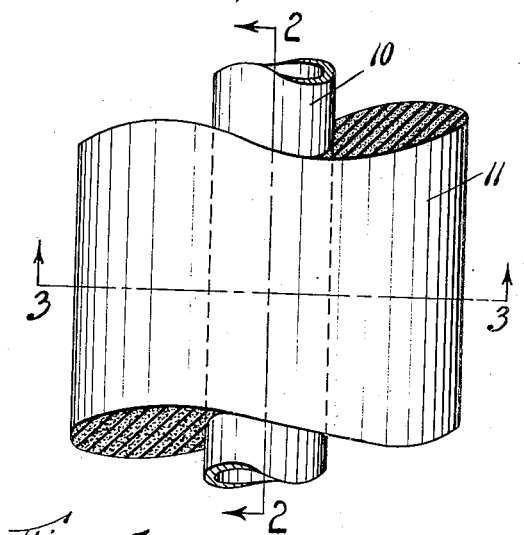
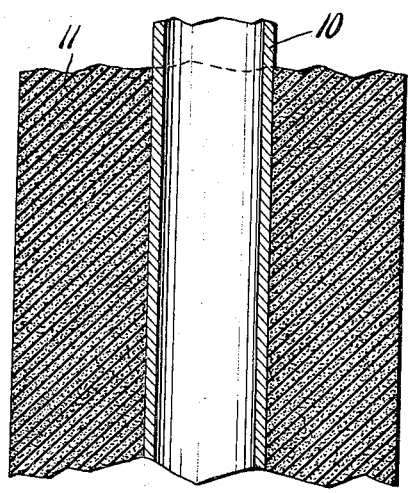
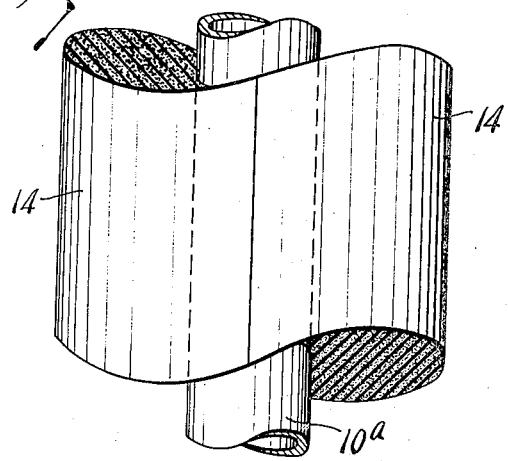
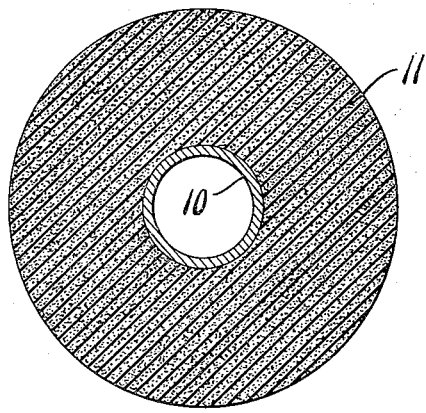
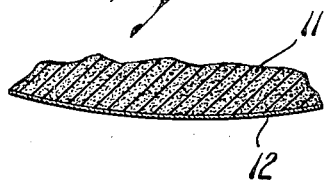
INVENTOR
HAROLD W. GREENUP
BY Albert L. Ely.
ATTORNEY Patented May 9, 1939

2,157,096

UNITED STATES PATENT OFFICE 2,157,096

THERMAL INSULATION

Harold W. Greenup, Akron, Ohio, assignor to The Firestone Tire & Rubber Company, Akron, Ohio, a corporation of Ohio Application February 10, 1936, Serial No. 63,081

6 Claims. (Cl. 91—68)

This invention relates to thermal insulation, and more especially it relates to thermal insulation consisting chiefly of rubber.

The invention may be used in various situations where it is desirable to insulate structures from heat or cold, and it is of especial utility for insulating cold pipes against heat.

The use of rubber composition for thermal insulation is not broadly new, but, so far as applicant is aware, such rubber compositions heretofore have been in the form of hard or soft cellular or sponge rubber. Such compositions are manufactured by incorporating a suitable blowing agent in the plastic, unvulcanized composition, and then vulcanizing in the presence of heat, usually in a mold. Only a small quantity of the material is initially placed in the mold, the function of the blowing agent being to form gas cells within the material and thereby to expand and force the latter into conformity with the walls of the molding cavity. It is impossible, however, satisfactorily to make cellular rubber of the character mentioned in other than the simplest shapes for the reason that the expansion of the composition during vulcanization causes it to buckle and fold, with the result that its surface is creased and irregular and its insulating properties are not uniform in various regions of its structure.

The chief objects of this invention are to provide an improved insulating material of low thermal conductivity; to provide thermal insulation of rubber composition that has none of the disadvantages of cellular rubber; and to provide against the absorption of moisture by the insulating material. Other objects will be manifest.

Of the accompanying drawing,

Figure 1 is a fragmentary elevation of a length of the improved insulation, in its preferred form, shown in association with a pipe that it insulates;

Figure 2 is a section on the line 2—2 of Figure 1;

Figure 3 is a section on the line 3—3 of Figure 1;

Figure 4 is a fragmentary section of the insulating material, on a larger scale, at a surface thereof; and Figure 5 is a fragmentary elevation of a modified embodiment of the invention.

Briefly stated, the improved insulation consists of microporous hard rubber composition provided with a surface coating of dense, impervious material for preventing the absorption of moisture thereinto. The microporous hard rubber is made from rubber latex that is coagulated and then vulcanized in the wet state. Upon coagulation, the solid rubber particles or globules aggregate and adhere to each other in the form of a colloidal net or reticulated mass in which the water constituent is still present, both the rubber network and the water being continuous from one side of the mass to the other. Vulcanization is effected under conditions which prevent the evaporation or other escape of the water in the pores of the coagulum so that the cell walls in the structure, due to the presence of water, do not collapse. After vulcanization, the product is dried to remove the water therefrom, and thereafter is treated with a suitable impervious material to seal the pores of the material on the surface thereof, whereby subsequent absorption of water is prevented.

The method and materials employed for the manufacture of the microporous hard rubber are substantially identical with those disclosed in my prior U. S. Patent No. 1,959,160, issued May 15, 1934, except that the proportions of the ingredients used are such as to produce a product of optimum utility for the purpose intended. An illustrative formula that has produced satisfactory results follows:

Example

| | Grams |
|---|---|
| 60% centrifuged latex | 166 |
| 50% sulfur suspension | 96 |
| 40% zinc oxide suspension | 5 |
| 10% 2-mercapto-benzo-thiazole solution | 16.7 |
| 60% ethylene-diamine solution | 5 |
| 20% di-phenyl-guanidine suspension | 7.1 |
| Ammonium nitrate | 1.9 |
| Water | 797 |

The foregoing ingredients were thoroughly mixed and then poured into a mold, the ammonium nitrate solution being added just before pouring. The mixture was then vulcanized, without loss of water, for 100 minutes at 320° F., and thereafter was dried 48 hours at 70° C. Thereafter the product was coated with a dense, impervious coating to seal the pores of the structure at the surface thereof. Said coating may consist of melted asphalt, or it may be a paraffin emulsion. If desired, powdered aluminum may be dusted onto the product as a further aid in preventing the passage of heat therethrough.

The product made according to the foregoing formula has an apparent density of .14 and contains approximately 88% of void space by volume. It is an extremely efficient heat insulating material, tests showing it to have a thermal conductivity about 21% lower than that of pressed cork insulation.

Referring to the drawing wherein is shown specific embodiments of the invention, 10 designates a pipe for the conduction of fluid, such as a refrigerant, and 11 is a tubular structure of the improved insulating material about said pipe. Both the inner periphery and the outer periphery of the structure 11 has a thin surface coating of impervious material, such as asphalt, which coating is too thin for full-size illustration, but is indicated at 12 in the greatly magnified section shown in Figure 4. The structure 11 is molded in tubular form for the reason that shrinkage upon cooling is less pronounced. In this form it is especially adapted for original installation since it may be mounted upon the pipe 10 before the latter is joined to other pipe sections.

In the modified embodiment of the invention shown in Figure 5, the insulating structure comprises two longitudinally extending, half-round sections 14, 14 that are suitably secured about the pipe 10ª. The sections 14 may be individually molded, or they may be formed by longitudinally sawing a tubular structure 11 in half. In either event the impervious coating applied to the insulation will cover the plane faces thereof. This embodiment of the invention is especially suitable for use on old installations since it can be applied without separating the pipe sections.

The invention provides superior thermal insulation; it may be made in complicated shapes, and it achieves the other advantages set out in the foregoing statement of objects. Modification may be resorted to without departing from the spirit of the invention or the scope of the appended claims.

What is claimed is:

1. Thermal insulation comprising hard rubber composition having microscopic pores extending throughout said composition and having an apparent approximate density of .14 and containing approximately 88% void space by volume, and an impervious coating on the outer surface of said composition for sealing the ends of said pores.

2. Thermal insulation composition comprising a hard rubber reticular mass having microscopic pores extending throughout the composition having an apparent approximate density of .14 and containing approximately 88% void space by volume, and an impervious coating over the entire surface thereof for sealing the pore openings on said surface.

3. A thermal insulating body comprising a mass of microporous hard rubber composition in which the rubber is in the form of a continuous colloidal net or reticulated mass and having an apparent approximate density of .14 and containing approximately 88% void space by volume.

4. As a new article of manufacture, a thermal insulating body comprising a mass of microporous hard rubber composition having an apparent approximate density of .14 and containing approximately 88% void space by volume.

5. As a new article of manufacture, a thermal insulating body comprising a mass of microporous hard rubber composition having an apparent approximate density of .14 and containing approximately 88% void space by volume, and an impervious coating covering the exposed surface of said body.

6. As a new article of manufacture, a thermal insulating body comprising a mass of microporous hard rubber composition having an apparent approximate density of .14 and containing approximately 88% void space by volume, and an impervious coating of powdered aluminum covering the exposed surface of said body.

HAROLD W. GREENUP.